Jan. 6, 1953

J. M. PEARSON 2,624,198

FLOWMETER

Filed Sept. 8, 1949

INVENTOR.
JOHN M. PEARSON
BY
ATTORNEYS.

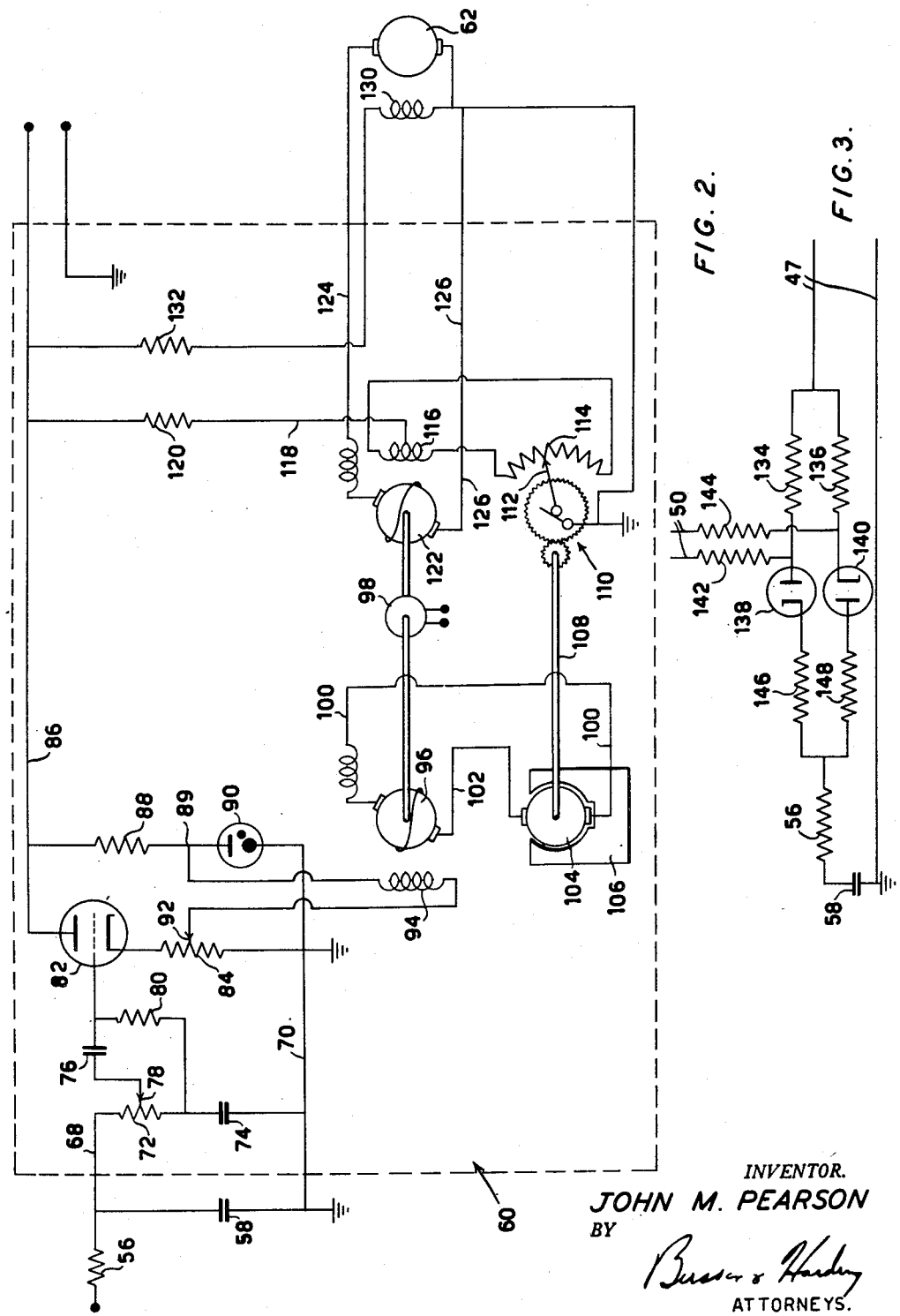

Jan. 6, 1953 J. M. PEARSON 2,624,198
FLOWMETER

Filed Sept. 8, 1949 3 Sheets-Sheet 3

INVENTOR.
JOHN M. PEARSON
BY
ATTORNEYS.

Patented Jan. 6, 1953

2,624,198

UNITED STATES PATENT OFFICE 2,624,198

FLOWMETER

John M. Pearson, Swarthmore, Pa., assignor to Sun Oil Company, Philadelphia, Pa., a corporation of New Jersey Application September 8, 1949, Serial No. 114,587

12 Claims. (Cl. 73—194)

This invention relates to a flow meter designed to measure flow in terms of mass of the fluid.

Flow meters in general are incapable of measuring mass flow to a high degree of accuracy and the accuracies attained are particularly bad when measurements are to be made of the flow of liquids which are of high viscosity or of varying viscosity, or when they contain solid materials as in the case of sludges or suspensions of mud as are, for example, involved in oil well drilling operations. It is the broad object of the present invention to provide a flow meter which is capable of the accurate measurement of mass flow, particularly of liquids containing solids in suspension or of variable viscosities. As will appear, the measuring apparatus does not involve any substantial obstruction to flow imposed by the presence of impellers, displaceable elements, or the like.

The principle involved in accordance with the present invention is gyroscopic. The fluid undergoing measurement is caused to flow in a coil which is rotated or oscillated about an axis at right angles to the coil axis. Since the fluid passing through the coil has an angular momentum about the coil axis, the angular movement of the coil about a perpendicular axis produces a couple about a third axis normal to the other two, all three axes being considered fixed to the rotating coil. As will become apparent from consideration of this configuration, the magnitude of this couple would be a function of the mass of the fluid which is flowing.

Difficulties are involved in the measurement of a couple so produced in such fashion as to give rise to accurate measurements of the mass flow. In the preferred form of the invention, and constituting another object thereof, these difficulties are eliminated by associating with the coil a mechanical gyroscope, for example, in the form of a rotating wheel of suitable moment of inertia in such fashion that it is maintained on the average in rotation in an opposite direction to the mass flow through the coil to provide an equal and opposite angular momentum with respect to that of the fluid. The device is, therefore, fundamentally operated free of a gyroscopic couple, there being provided sensitive detecting means capable of continuously correcting the momentum of the mechanical gyroscope with the result that the number of revolutions of the compensating mechanical gyroscope is a direct measure of the mass of material which is flowing through the coil, and the speed of the compensating gyroscope, when equilibrium is attained, is a direct measure of the instantaneous rate of mass flow.

The foregoing and other objects of the invention, particularly relating to details of construction and operation, will become apparent from the following description read in conjunction with the accompanying drawings, in which:

Figure 2 is a wiring diagram showing details of a controller involved in Figure 1;

Figure 3 is a wiring diagram showing the nature of a lock-in detector indicated in Figure 1;

Since the flow meter is particularly adapted to the measurement of the mass flow of liquids (including liquids carrying solids or gases in suspension), reference will be hereafter made to liquids as the fluids undergoing measurement, though it will be apparent that with careful construction, sufficient to secure the required sensitivity, the flow of vapors and gases may be equally well measured, including the flow of vapors or gases containing solids or liquids in suspension, the measurement then being, of course, of the total mass including the suspended material.

Figure 1:
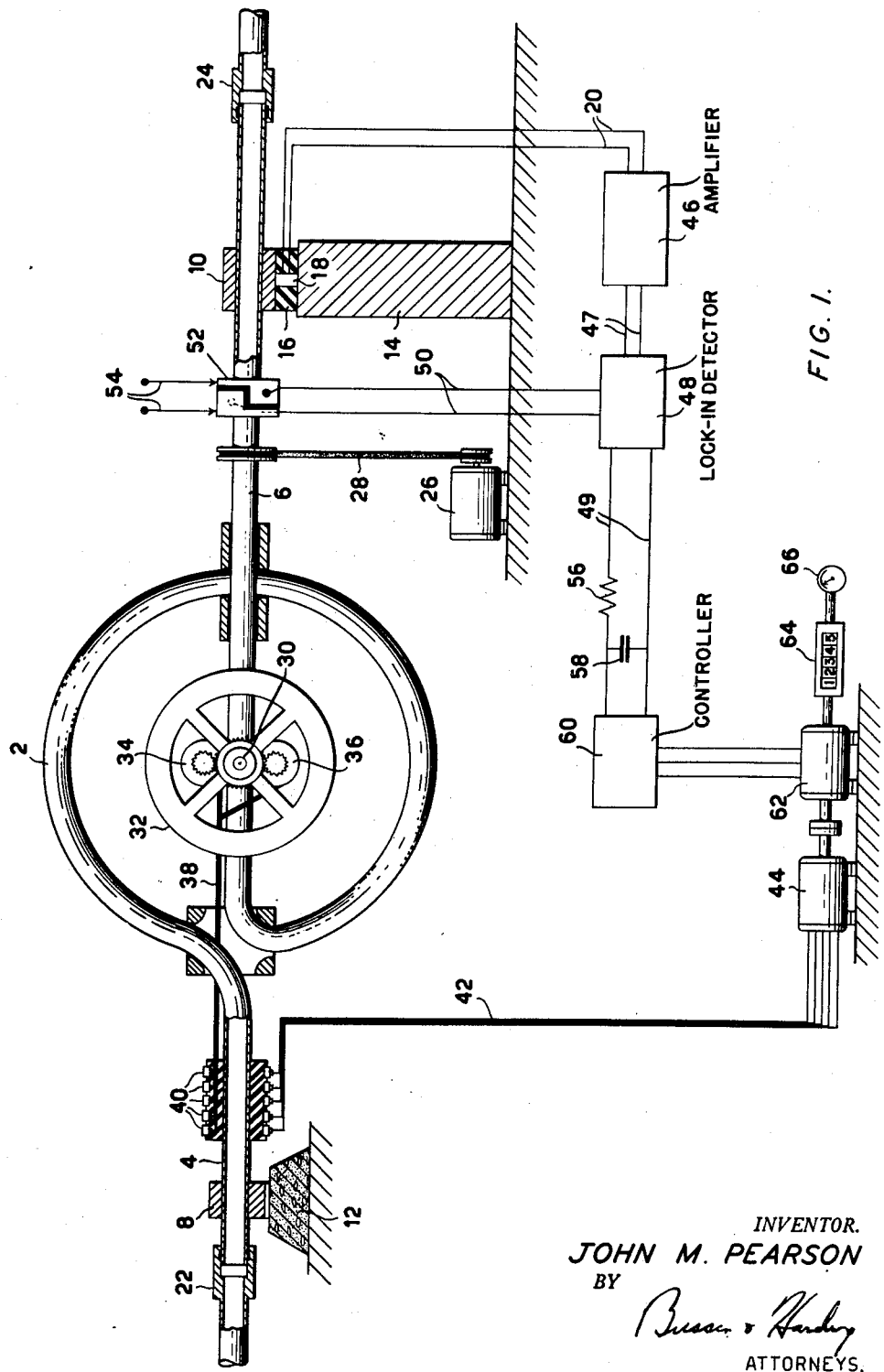
Figure 1 is a diagram illustrating one type of apparatus which may be used to secure the desired results.

Referring first to the modification particularly illustrated in Figure 1, a coil formed of tubing adapted to conduct the liquid undergoing measurement is indicated at 2. As shown, this involves only one turn but it will be evident that the coil may involve any desired number of turns to enhance the angular momentum involved in the operation. The coil, whatever its form may be, is arranged to have its axis normal to the axis of support about which the coil turns defined by radially directed aligned extensions 4 and 6. As illustrated in Figure 1, the extension 4 is mounted in a bearing 8 which may be either rigidly or resiliently supported on a supporting structure indicated at 12. The extension 6 is mounted in a bearing 10 which is resiliently supported as, for example, through a block of rubber 16, on a fixed supporting member 14.

A transducer 18 is provided which will give an electrical output dependent upon couples which may appear in the coil due to the gyroscopic effects which will be more fully referred to hereafter. This transducer 18 may be a piezo crystal pick-up, a resistance strain gauge, a carbon button microphone, or the like, which will provide an electrical output through lines indicated at 20, which output will correspond to the oscillations of the tube extension 6 operating as a shaft. Stuffing boxes 22 and 24 are provided at the ends of the tube extensions 4 and 6 to provide inflow and outflow of the liquid to and from the coil 2. A motor 26, desirably of the constant speed type, serves to drive through a belt 28 and cooperating pulleys the coil 2 to rotate it about the axis defined by the extensions 4 and 6. A suitable speed for rotation is, for example, 600 R. P. M. which will give rise at the transducer 18 to a signal of 10 cycles per second which may be easily amplified and used. It will be evident, however, that other speeds of rotation of the coil may be used, higher speeds being desirable if the fluid undergoing measurement is gaseous.

Considering the apparatus so far described, it will be apparent that when liquid is flowing through the coil the angular momentum of the liquid will, in accordance with the principles of a gyroscope, give rise to a couple about an axis which at all times is perpendicular to both the axis of the coil and the axis of rotation of the coil, i. e., about an axis which would appear vertically in the plane of the paper in Figure 1. This couple will produce oscillations at the transducer 18 through the medium of which it conceivably could be measured, and when measured, could give a result which would, in turn, be a measure of the mass flow through the coil. The actual motion, of course, at the bearing 10 could and should be very minute, being merely sufficient to deform a piezo crystal transducer.

Measurement of the couple which is produced in this fashion would evidently be quite difficult and, accordingly, in the preferred form of the invention, the angular momentum of the liquid is compensated by an opposite sense of rotation of a flywheel so that the couple referred to is used only for the detection of uncompensated angular momentum. The system, accordingly, is of a null type involving a feed-back of angular momentum of a compensating nature.

To accomplish this result there is mounted on an axis 30, coinciding with the axis of the coil, a flywheel 32 of suitable moment of inertia which is arranged to be driven through suitable gearing from a pair of Selsyn motors 34 and 36, the rotation of which is controlled. While one of these motors would be sufficient, it is desirable to use a symmetrically arranged pair, rotating in the same direction, to secure better static and dynamic balance. Input of current to these motors is provided through a cable 38, the conductors of which are connected to slip-rings 40 carried by the tube extension 4 and engaged by brushes connected to the conductors of a cable 42 which conductors are, in turn, connected to a Selsyn transmitter 44.

The signals from the transducer 18 are delivered through connections 20 to an amplifier 46 of conventional type suitable for the amplification of the signals at their frequency such as 10 cycles per second mentioned above. This amplifier should be of stable type designed to have a minimum phase shift over the frequency range used to the extent that this range may be variable due to non-uniform rotation of the coil. The output from the amplifier is delivered through connections 47 to a lock-in detector 48 of a type detailed more fully in Figure 3. To this lock-in detector locking signals are delivered through connections 50 from brushes which bear on segments of a commutator indicated at 52 which provides reversal of a direct input, introduced at 54, in synchronism with the rotation of the coil. The lock-in detector output is delivered through connections 49 and through resistance 56 to a condenser indicated at 58 which accumulates a potential measuring the in-phase components of the signals from the transducer 18. The potential appearing across the condenser 58 is used to actuate a controller 60 which is detailed in Figure 2, which controller, in turn, serves to drive a motor 62 driving the Selsyn transmitter 44 so as to control the rotation of the flywheel 32. The shaft of the motor 62 drives a counter 64 which provides a direct measure of the mass flow and also drives a tachometer 66 which, measuring the speed of rotation of the flywheel, serves, when there exists a condition of stability, to give instantaneous indications of the rate of mass flow.

The controller 60 and its associated input and output elements are shown in Figure 2.

The potential across the condenser 58 is imposed through lines 68 and 70 across the potentiometer resistance 72 and condenser 74 arranged in series. Between the junction of potentiometer 72 and condenser 74 and the potentiometer contact 78 there are arranged in series a condenser 76 and resistance 80. The junction between the last two elements is connected to the grid of a triode 82 which is in a cathode follower circuit including a cathode resistance 84 of a potentiometer. Positive high voltage is supplied to the anode of the triode from the line 86.

Between the line 86 and ground there is a resistance 88 and a gaseous voltage regulator tube 90, the arrangement being such as to maintain a constant potential at the junction 89 between the resistance 88 and the anode of the regulating tube 90. This junction 89 is connected to the contact 92 of potentiometer 84 through the shunt field of an armature- reactance-excited direct current generator of the amplidyne type, the armature of which is indicated at 96 and is driven by an induction motor 98. The output from the generator 96 is delivered through connections 100 and 102 to the armature 104 of a motor having a permanent magnet field 106. This motor through its shaft 108 and reduction gearing 110 drives the contact arm 112 of an Ayrton shunt 114 which is across the shunt field 116 of a second amplidyne generator 122 driven by the induction motor 98. The central point of the field 116 is supplied with constant direct current through the resistance 120 from the line 86, connection to ground being effected through the movable contact arm 112 of the shunt 114.

The output from the generator 122 is delivered through lines 124 and 126 to the armature of the direct current motor 62 the field 130 of which is provided with constant direct current through the resistor 132 connected to the line 86.

Reference may now be made to Figure 3 which shows the synchronous lock-in detector or rectifier indicated at 48 in Figure 1. This may be of any of the types described in detail in the patent to Elbert Neil Shawhan, Number 2,559,173, dated July 3, 1951. In the form illustrated it involves input from ungrounded line 47 through a pair of resistances 134 and 136 connected respectively to the anode and cathode of a pair of diodes 138 and 140 of which the cathode and anode are respectively connected through resistances 146 and 148 to the resistance 56, heretofore referred to. The synchronizing currents through the leads 50 are delivered to the anode and cathode, respectively, of the two diodes through resistances 142 and 144.

As fully described in said Shawhan patent the lock-in or synchronous rectifying system just described is, by virtue of the introduction of the synchronizing signals through the connections 50, capable of an extremely high degree of discrimination of signals from the amplifier 46 which are of the frequency of the synchronizing signals against spurious background or other disturbances. Furthermore, the output of this synchronous rectifier is phase-sensitive in the sense that it will discriminate against components of the input signals which are 90° out of phase with the synchronizing signals from the lines 50. Accordingly, by taking into account any fixed phase shift occurring in the amplifier 46 and properly locating the brushes on the commutator 52, signals which are due to the gyroscopic couple may be caused to give a potential across the condenser 58 with substantial elimination of all other signals including, in particular, those which are in quadrature with the desired signals. This last is particularly important since changes in density of the liquid undergoing measurement may give rise to large quadrature signals which should be, and will be, eliminated by the action of the synchronous rectifier. The potential build up on the condenser 58, which build up may be made quite rapidly to a fixed value, will be a measure of the residual couple of the system, being positive, for example, if the angular momentum of the liquid exceeds that of the flywheel, and negative if the angular momentum of the flywheel exceeds that of the liquid. When the two momenta are equal so as to balance each other a zero potential will appear across the condenser 58. It may be here noted that the rotating system including the coil, flywheel motors and associated parts should be dynamically and statically balanced. They should also run at speeds remote from the critical speed, either above or below the same, since near the critical speed the phase of reaction at the bearings is very sensitive to speed changes.

The potential appearing across the condenser 58 controls the motor 62 through the controller 60 as follows:

The grid of the triode 82 receives its signals from two paths. Under steady conditions the resistance 80 picks up the signal from the condenser 74 which receives the signal through the potentiometer resistance 72. Under unsteady conditions the rate of change of the charge on the condenser 74 produces a gradient in the potentiometer 72 part of which is communicated to the triode grid by way of the condenser 76. If the time constant of the condenser 76 and resistance 80 is long compared to the time constant of resistance 72 and condenser 74, the signal to the grid through the resistance 80 is essentially the steady potential appearing between the input lines 68 and 70 while the signal applied to the grid through the condenser 76 is proportional to the first derivative with respect to time of this potential. The total signal applied to the grid is, therefore, proportional to the value of the signal plus a voltage corresponding to its first time derivative.

Since the triode 82 is in a cathode follower arrangement, the potential appearing at any point of the load resistor 84 varies substantially linearly with the potential of the grid. The potentiometer contact 92 is adjusted so that the field 94 receives zero excitation when the grid voltage is zero. Accordingly, the effect of the signal is to excite the field 94 with a polarity corresponding to the signal polarity and, to an extent, substantially linearly related to the signal polarity appearing at the grid. The amplidyne generator, accordingly, produces an output potential which will drive the permanent field motor 104 at a speed proportional to the signal at the grid of triode 82, the direction of this motor being reversed with reversal of sign of the grid signal. Through control by the motor 104 of the relative currents through the two halves of the amplidyne field coil 116 the rate of change of voltage generated by the amplidyne generator 122 is caused to be substantially directly proportional to the signal appearing at the triode grid, i. e., to the sum of the original signal voltage appearing across the condenser 58 and the first derivative thereof.

The output of the amplidyne generator 122 supplies the armature of motor 62 the field of which is excited by constant current through the resistance 132. Since the speed of the motor 62 varies directly with its armature voltage, its speed will be constant when the original signal and its first derivative are both zero, and its speed will be accelerated up or down according to the value and sign of the algebraic sum of the signal and its first derivative. An analysis of the control system, which need not be detailed here since it is similar to the analysis of conventional controls, will reveal that the angular velocity of the flywheel 32 will either oscillate, with damping, about the value given by the quotient of the angular momentum of the fluid divided by the moment of inertia of the mechanical gyro parts about the axis 30, or will approach this value if overdamping is provided by the system. In either case the angular velocities of the flywheel will settle down to this value whenever the value of the angular momentum of the liquid becomes fixed. Stability and rapidity of response may be attained by the choice of suitable constants for the control system, all in accordance with the usual considerations applying to control systems. It will be evident that other control systems than that described may be substituted at 60 with equivalent results in effecting, on the average, correspondence between the rotation of the flywheel 32 and the angular momentum of the fluid undergoing measurement.

As a result of the control of the flywheel the total revolutions of the flywheel will be directly proportional to the total mass of fluid passing through the coil. While at some times the flywheel will be rotating at a velocity in excess of that corresponding to the mass rate of flow and, at other times, at a velocity less than this, during the periods of attainment of equilibrium the direct proportionality which has been mentioned will be attained from the time of beginning of a completely balanced condition to any time of reattainment of a completely balanced condition so that, integrated over any extended period, the total revolutions of the flywheel will measure accurately the total mass flow, and this will be directly indicated on the counter 64. The tachometer 66, of course, indicates rate of mass flow accurately only at times when a balance is achieved though, in general, if the controller is so designed that the oscillations of the flywheel above and below proper speeds corresponding to the mass rate of flow are small the tachometer will, at all times, indicate a close approximation to the mass flow, particularly if readings are made of the value about which its needle oscillates.

It will be evident that in accordance with the foregoing there is provided a flow meter which reads in terms of mass flow and is hence independent of density and viscosity changes. Since only smooth bore tubing is involved, there are no obstructions which preclude the use of the meter for handling liquids containing solids in suspension, the reading of the meter in such case indicating, of course, the mass flow of the fluent material including both the actual liquid and suspended solids or gases carried in it.

It may further be noted that the flow meter will detect the direction of flow as well as the amount of flow, the flywheel reversing its direction in the case of reversal of direction of the fluid flow with the counter 64 correspondingly running in a negative direction. Accordingly, the meter may be used under conditions in which, through a given conduit, the direction of flow may change and wherein it is desired to secure a measurement of the net flow in a particular direction.

It may be pointed out that since the lock-in signal is taken from a commutator carried by the rotating coil, variations in speed of this coil have a minimum effect on the feed-back control. Desirably, however, the speed of rotation is maintained fairly constant.

By adding mass to, or subtracting mass from, the flywheel it is possible to calibrate the angular momentum feed-back for any desired mass rate of flow.

Figure 4:
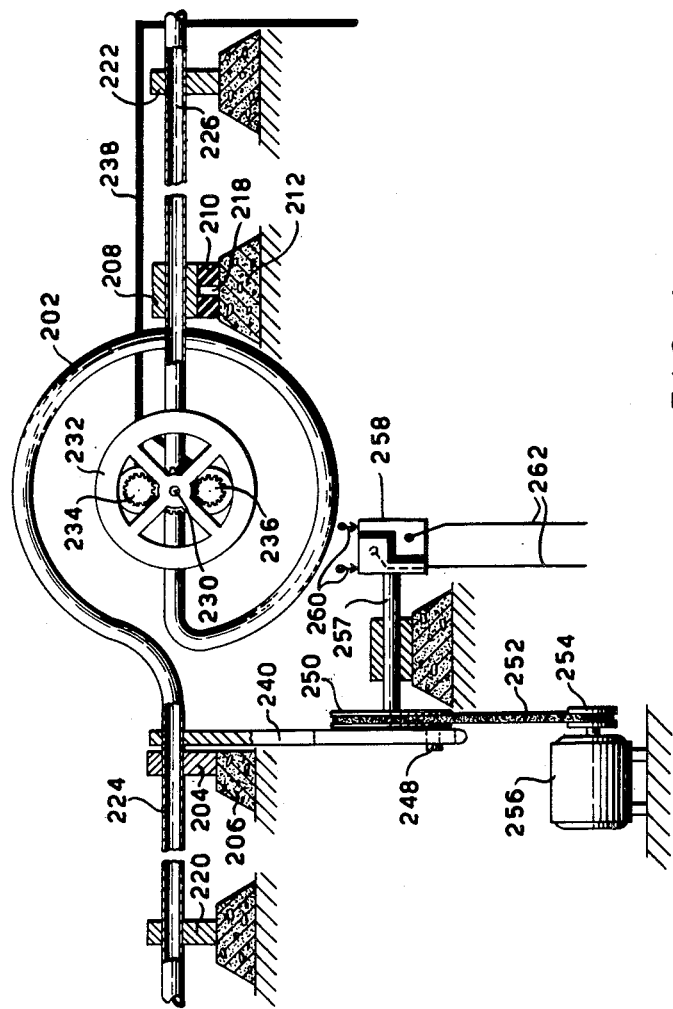
Figure 4 is a diagram similar to Figure 1 but showing an alternative type of apparatus for carrying out the invention.
Figure 5:
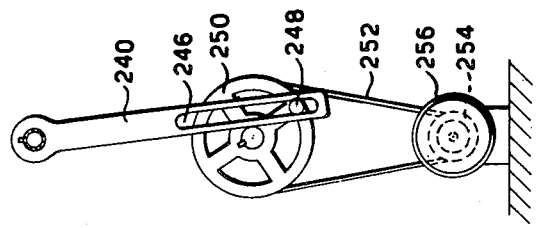
Figure 5 is a fragmentary elevation of a portion of the apparatus illustrated in Figure 4.

In the preceding description the coil has been primarily referred to as rotating. However, rotation of the coil involves difficulties in connection with the provision of stuffing boxes, etc., and a generally more desirable arrangement is provided if the coil oscillates rather than rotates. Figs. 4 and 5 illustrate a form of the invention in which oscillation of the coil is used rather than rotation to give rise to the gyroscopic forces which produce the measurement. A coil 202 similar to the coil 2 previously described has its inflow and outflow extensions mounted in bearings 204 and 208. The former is a rigid bearing secured to a rigid support 206. The latter, on the other hand, is mounted in a rubber block 210 carried by a block 212 of rigid construction. Within the block 210 there is located a crystal transducer 218 corresponding to the transducer 18. Rigid mountings 220 and 222 support respectively the connections 224 and 226 which are sufficiently long so as to be capable of torsional oscillation at the bearings 204 and 208. The coil is associated with a flywheel 232 and controlling arrangements 234 and 236 including symmetrically arranged motors as previously described having external connections at 238 in the same fashion as has been provided in connection with the modification of Fig. 1. It may be noted that if the plane of the loop oscillates about the vertical as indicated, the crystal transducer should be of known type responsive to shear if located as shown.

An arm 240 is keyed to the shaft extension 224 and is provided with a slot 246 which embraces a pin 248 carried by a pulley 250. The pulley 250 is driven through belt 252 from a pulley 254 driven by a motor 256. As will be evident the rotation of the pulley 250 will produce through the arm 240 an oscillation of the coil 202. To the shaft 257 of the pulley 250 there is secured a commutator 258 which by commutation of the input 260 provides a reversal of input to the synchronous rectifier which may be connected to the leads 262 in the same fashion as that illustrated in Fig. 3. The remainder of the apparatus may be as previously described in particular with reference to Figs. 2 and 3. The commutator 258 is so arranged that in its rotation it will reverse the input to the connections 262 at the time the direction of oscillation of the coil 202 reverses. As will be evident the result will be a gating of the signals in such fashion that the flywheel 232 will be controlled by the signals picked up by the transducer 218, with the same result as previously described, namely, the operation of the flywheel in such fashion as to balance the momentum of the liquid or other fluid flowing through the coil. Measurements of the flow will accordingly be made in the same fashion as previously described in detail.

What is claimed is:

1. A flow meter comprising a curved conduit, means for leading fluid to and from said conduit, means for imparting to said conduit angular movement about an axis transverse to an axis about which there exists angular momentum of the fluid flowing through the conduit, and means, including a device sensitive to gyroscopic couples of said conduit transverse to the axis of movement of the conduit, for indicating mass flow through the conduit.

2. A flow meter comprising a curved conduit, means for leading fluid to and from said conduit, means for imparting to said conduit angular movement about an axis transverse to an axis about which there exists angular momentum of the fluid flowing through the conduit, and means, including a device sensitive to gyroscopic couples of said conduit transverse to the axis of movement of the conduit, for indicating the rate of mass flow through the conduit.

3. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, means controlled by said sensitive means for effecting rotation of said mass at a velocity such that its angular momentum is approximately continuously equal and opposite to that of the fluid flowing through the conduit, and means controlled by the last mentioned means for indicating mass flow through the conduit.

4. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, means controlled by said sensitive means for effecting rotation of said mass at a velocity such that its angular momentum is approximately continuously equal and opposite to that of the fluid flowing through the conduit, and means controlled by the last mentioned means for indicating the rate of mass flow through the conduit.

5. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means and providing an output corresponding to such signals only of predetermined phase characteristics, means controlled by said output for effecting rotation of said mass at a velocity such that its angular momentum is approximately continuously equal and opposite to that of the fluid flowing through the conduit, and means controlled by the last mentioned means for indicating mass flow through the conduit.

6. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means and providing an output corresponding to such signals only of predetermined phase characteristics, means controlled by said output for effecting rotation of said mass at a velocity such that its angular momentum is approximately continuously equal and opposite to that of the fluid flowing through the conduit, and means controlled by the last mentioned means for indicating the rate of mass flow through the conduit.

7. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means, means supplying to said phase discriminating means a synchronizing input predeterminedly related to the angular movement of said conduit about the first mentioned axis, said phase discriminating means providing an output corresponding to such signals only of predetermined phase characteristics, means controlled by said output for effecting rotation of said mass at a velocity such that its angular momentum is approximately continuously equal and opposite to that of the fluid flowing through the conduit, and means controlled by the last mentioned means for indicating mass flow through the conduit.

8. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means, means supplying to said phase discriminating means a synchronizing input predeterminedly related to the angular movement of said conduit about the first mentioned axis, said phase discriminating means providing an output corresponding to such signals only of predetermined phase characteristics, means controlled by said output for effecting rotation of said mass at a velocity such that its angular momentum is approximately continuously equal and opposite to that of the fluid flowing through the conduit, and means controlled by the last mentioned means for indicating the rate of mass flow through the conduit.

9. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means and providing an output corresponding to such signals only of predetermined phase characteristics, means controlled by said output and the first time derivative of said output for effecting rotation of said mass at a velocity such that its angular momentum is approximately continuously equal and opposite to that of the fluid flowing through the conduit, and means controlled by the last mentioned means for indicating mass flow through the conduit.

10. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means and providing an output corresponding to such signals only of predetermined phase characteristics, means controlled by said output and the first time derivative of said output for effecting rotation of said mass at a velocity such that its angular momentum is approximately continuously equal and opposite to that of the fluid flowing through the conduit, and means controlled by the last mentioned means for indicating the rate of mass flow through the conduit.

11. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means, means supplying to said phase discriminating means a synchronizing input predeterminedly related to the angular movement of said conduit about the first mentioned axis, said phase discriminating means providing an output corresponding to such signals only of predetermined phase characteristics, means controlled by said output and the first time derivative of said output for effecting rotation of said mass at a velocity such that its angular momentum is approximately continuously equal and opposite to that of the fluid flowing through the conduit, and means controlled by the last mentioned means for indicating mass flow through the conduit.

12. A flow meter comprising a curved conduit, means for leading fluid to and from said conduit, means for imparting to said conduit angular movement about an axis transverse to an axis about which there exists angular momentum of the fluid flowing through the conduit, a rotating mass secured to said conduit and mounted for rotation about said second axis, means sensitive to gyroscopic couples of said conduit transverse to the axis of movement of the conduit, phase discriminating means receiving signals from said sensitive means, means supplying to said phase discriminating means a synchronizing input predeterminedly related to the angular movement of said conduit about the first mentioned axis, said phase discriminating means providing an output corresponding to such signals only of predetermined phase characteristics, means controlled by said output and the first time derivative of said output for effecting rotation of said mass at a velocity such that its angular momentum is approximately continuously equal and opposite to that of the fluid flowing through the conduit, and means controlled by the last mentioned means for indicating the rate of mass flow through the conduit.

JOHN M. PEARSON.

No references cited.